US007827596B2

(12) United States Patent
Loen (10) Patent No.: US 7,827,596 B2
(45) Date of Patent: Nov. 2, 2010

(54) AUTHENTICATING COMPUTED RESULTS IN A PUBLIC DISTRIBUTED COMPUTING ENVIRONMENT

(75) Inventor: Larry Wayne Loen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1469 days.

(21) Appl. No.: 11/212,006

(22) Filed: Aug. 25, 2005

(65) Prior Publication Data

US 2007/0050841 A1 Mar. 1, 2007

(51) Int. Cl.
*G06F 21/00* (2006.01)
*H04L 9/32* (2006.01)
(52) U.S. Cl. .............................. 726/4; 726/17; 713/168
(58) Field of Classification Search ...................... 726/2, 726/4, 7, 17; 713/150, 168, 170; 705/50, 705/51, 64
See application file for complete search history.

(56) References Cited

U.S. PATENT DOCUMENTS 6,327,658 B1 * 12/2001 Susaki et al. ................ 713/176
6,463,457 B1 * 10/2002 Armentrout et al. ......... 709/201
2002/0013832 A1 * 1/2002 Hubbard ..................... 709/220
2002/0023214 A1 * 2/2002 Shear et al. ................. 713/170
2004/0148336 A1 * 7/2004 Hubbard et al. ............. 709/202
2008/0263131 A1 * 10/2008 Hinni et al. ................. 709/202

* cited by examiner

*Primary Examiner*—Gilberto Barron, Jr.
*Assistant Examiner*—Abdulhakim Nobahar
(74) *Attorney, Agent, or Firm*—Martin & Associates, LLC; Derek P. Martin (57) ABSTRACT

An apparatus and method authenticate computed results in a public distributed computing environment without the need for fully recomputing the results. The work unit is operated on by client code that computes one or more partial results along with the completed result. When the results are returned to the server, the server may decide to have a trusted computer system process the same work unit to compute the partial result according to a defined acceptance policy. In addition, the work unit name, user identity and current date are encrypted using a time-sensitive key. Should the server detect a problem with the results (e.g., decrypted work unit name does not match, recomputed partial result does not match), the results may be rejected according to a defined rejection policy. In this manner, it becomes very difficult to fool a server into thinking a work unit has been processed when it has not.

13 Claims, 7 Drawing Sheets

AUTHENTICATING COMPUTED RESULTS IN A PUBLIC DISTRIBUTED COMPUTING ENVIRONMENT

BACKGROUND OF THE INVENTION

1. Technical Field

This invention generally relates to computer systems, and more specifically relates to mechanisms and methods for public distributed computing.

2. Background Art

Public distributed computing is a relatively new phenomenon that allows a large number of computer systems to work on small tasks that make up small portions of a much larger task. Due to the vast numbers of computers that are connected to the Internet that have spare computing capacity, there is the opportunity for putting that spare computing capacity to work on public distributed computing tasks.

In a typical public distributed computing environment, a server computer system has work it would like to distribute to other client computer systems. The server computer system may recruit client computer systems in any suitable way, including direct e-mail, web page advertisements, or other advertisements that direct a user to go to a given web site or to e-mail a given e-mail address if the user is interested in participating in the project by allowing the user's machine to work on these tasks during idle times. When a user decides to participate, the user downloads and installs client code and permits it to execute. The user's client computer system requests work (a work unit) from the server. The server then sends a work unit to the client. The client code executes against the data in the work unit, which performs the desired work. When the processing of the work unit is done, the results are returned to the server. Note that the client code is typically reused by the client in processing many different work units.

One problem with public distributed computing is the ease of causing malicious results due to the lack of security. The security needed for a public distributed computing environment is much different than the security needed for financial transactions, network authentication, etc. In a financial transaction, for example, it is paramount that the user's identity be verified before performing any transactions on behalf of the user. Note, however, that in the public distributed environment, the server does not care about the actual identity of any particular user. The server only cares that the work is performed by the actual code provided by the server to any of the particular client computer systems and that the result, coming from normal (untampered-with) operation of such client code is returned to the server.

In current public distributed computing environments, the user identity (user id) is never validated. When the user "signs up" to join a particular public distributed computing project, any number of schemes may be employed. For example, the user may provide a "handle"—a fanciful name; an e-mail address; or may be assigned an arbitrary number. These may be employed or any number of similar means, individually or separately. The user id will be assumed in this document to be an individual. But, projects may use the notion of identity to represent a machine or the pairing of a user and a machine. None of this is critical. As will be seen, validation is not critical. What is critical is that there is an identity which forms a basis for certain exchanges of information between the server and what can be treated as a single individual with one or more machines, whatever the actuality.

Authentication that is currently performed relies upon the user identity and work unit name. When a client requests work, a work unit is sent to the client with a work unit name. When the results are received from the client, the name of the work unit in the results is checked to assure the name matches the work unit sent. If so, the results are accepted. If not, the results are rejected.

Hackers have exploited this lack of security for their own devious ends. For example, it is often considered to be a status symbol for a user to have a high score that indicates his or her computer system has performed a lot of work on a particular project. These hackers have discovered various means for fooling the server into thinking the returned results are valid when they are not. For example, the same result could be submitted by several different identities that are all attributed to the user. In the alternative, the user could alter the client code to make the code exit prematurely, thereby performing the computation very quickly and returning a result that is not correct. If the name of the work unit in the result is correct, the server may accept it without knowing that the work was not actually performed and without knowing that the result is incorrect.

The prior art recognized this problem, and has devised some ways to detect incorrect results. One such way is to send out work units with known answers. The answers returned could then be checked against the known answers to determine of the user performed the work. Another known way is to send out the same work to several different users. For example, if the same task is sent to five different users, and if four of the five return the same result, it is a good assumption that the fifth result is in error. Note that an error may be caused by a hardware or other system failure in addition to intentionally incorrect results returned by users who have malicious intent. Both of these prior art ways of checking answers require computing the entire answer multiple times, thereby reducing the available computing power to work on the overall problem.

The check performed by sending the same work to several different users may fail against well-organized, cooperative hackers. If, by chance or by some clever scheme, four hackers determine they all have the same work unit, and they can contrive to return some arbitrary answer, their bogus answer will win the "vote" and be accepted. If the hackers rely on chance and most computation is honest, this is not a major problem. But, to the extent possible, it would be well to go beyond statistical assurances, especially if hackers managed to repeatedly obtain the same work unit through any exploitation of weakness (e.g., handing out work units in a predictable order). The goal of the hackers may or may not be to ruin the calculation—but regardless, it could be uncomfortable to be on the receiving end of an attack in which the presumption that hackers cannot conspire to share particular work units turns out to be false.

Meanwhile, the server's computational resources are badly outgunned by the available horsepower of the collective clients. Accordingly, added cycles to do validation of any kind could affect the critical path of the project, namely the checking in and checking out of work units. Therefore, the server does not have the luxury of doing extensive checks of the work going out or coming back in. Besides slowing down the underlying solution, participation rates may drop if the users perceive the check-in and check-out process is slow, unreliable, or both. Added checks risk just such an outcome, so any must be carefully chosen.

Without a way to more efficiently check the results returned from clients in a public distributed computing environment, the current methods will result in either excessive overhead in checking the results by computing each result multiple times, will result in excessive overhead by accepting additional copies of results, or will result in not detecting incorrect results.

DISCLOSURE OF INVENTION

According to the preferred embodiments, an apparatus and method for authenticating computed results in a public distributed computing environment provide an efficient way to check results without the need for fully recomputing the results. The first step creates an encrypted work unit name using a time-sensitive key from the server work unit name, an identity corresponding to the user, and the current date. The work unit that includes work unit data is sent to the user's client computer system with the encrypted work unit name. In response, the client computer system executes client code against the work unit data. The client code computes a first partial answer, then stores the first partial answer or, if the first answer is impractically large, a difficult to forge checksum in lieu of the partial result. The client code may optionally compute a second partial answer or, as before, a suitable checksum. The client then returns the results with the encrypted work unit name. The results include the client work unit name, the partial results or checksums, and the completed results. When the server receives the results, the server decrypts the client work unit name using a time-sensitive key. If the decrypted work unit name matches the secret work unit name on the server, the server knows the work unit name is valid. In addition, if the client work unit name does not match, or, as described later, other related checks fail, the work unit may be rejected according to some predefined policy. Some of the actions that may be performed when results are rejected include: suspending the user account; selecting future work units to the user account for increased scrutiny; zeroing existing scores for the user account; recomputing the rejected work units; and discarding previously-computed results from the user account.

If the decrypted work unit name in the results matches the secret work unit name on the server, the server may perform one of several different actions, which are preferably selected in a pseudo-random manner. One of the actions is to accept the results. Another of the actions is to assign the same work unit to a trusted computer system for computation to the first partial completion point, which allows comparing the results with the first partial results returned with the work unit. Another of the actions is to assign the same work unit to a trusted computer system for computation to the second partial completion point, which allows comparing the results with the second partial results returned with the work unit. By using a pseudo-random process for determining what action to perform, it is likely that results from different work units from the same user will sometimes be checked to the partial completion points, thereby providing verification of the work units without performing all of the work in the work unit.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The preferred embodiments provide an efficient way to validate computed results in a public distributed computing environment. An encryption scheme is used in the server on the work unit name, a user's identity, and the current date using a time-sensitive key to generate a work unit name that is unique for the work unit being sent to a particular user. When the work unit code is executed on a user's computer system, the code causes one or more partial results to be stored with the encrypted work unit name. The results returned to the server include the one or more partial results, along with the completed results. The server will decrypt the stored work unit name in the completed results to verify that it is valid. If it is valid, the server may select from a plurality of actions defined in an acceptance policy, including accepting the result, recomputing to a first partial result, and recomputing to the second partial result. If the decrypted work unit name in the completed results is not valid, or if any recomputations do not match, one or more actions may be performed according to a defined rejection policy.

Figure 1:
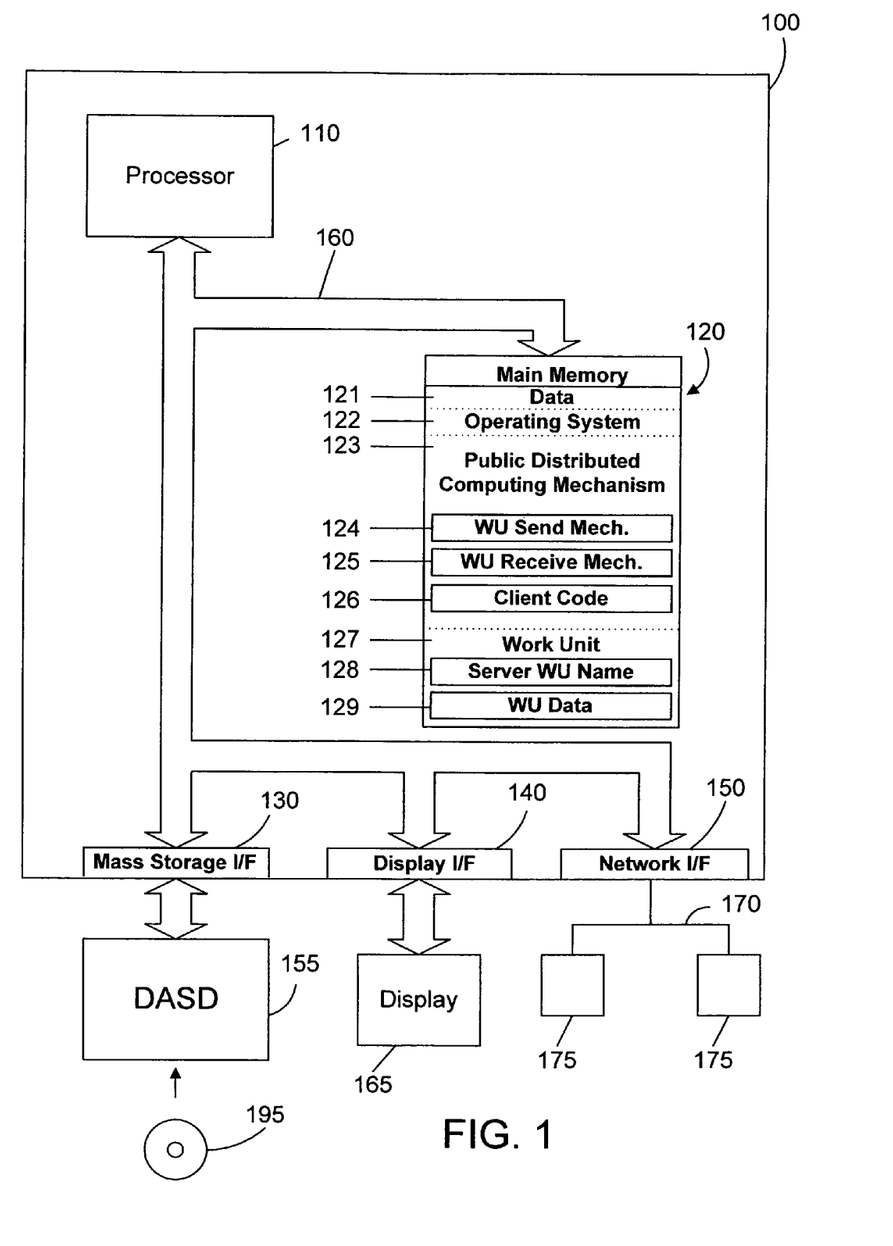
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, an embedded control system, or multiple computer systems that cooperate to perform a desired task. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195 (shown in FIG. 1). Another specific type of direct access storage device 155 is a magnetic hard disk drive.

Main memory 120 in accordance with the preferred embodiments contains data 121, an operating system 122, a public distributed computing mechanism 123, and a plurality of work units 127. Data 121 represents any data that serves as input to or output from any program in computer system 100. Operating system 122 is a multitasking operating system known in the industry as i5/OS; however, those skilled in the art will appreciate that the spirit and scope of the present invention is not limited to any one operating system.

The public distributed computing mechanism 123 includes a work unit send mechanism 124, a work unit receive mechanism 125, and client code 126. The work unit send mechanism 124 and work unit receive mechanism 125 are shown in more detail in FIGS. 2 and 3, respectively. The work unit send mechanism 124 sends client code 126 and work units 127 to client computer systems. In response, the client computer systems execute the client code 126 against the data 129 in the work units 127.

A work unit 127 includes a server work unit name 128 and work unit data 129. The server work unit name 128 is a name that is kept secret within the server and is not sent to client computer systems. The work unit data 129 is data that needs to be processed by the client code 126. The client code 126 preferably includes code that generates one or more partial results. For example, in the specific implementation shown herein, the client code 126 causes results to be stored at the 10% completion point and at the 50% completion point. When the client code 126 is done executing, the results are returned to the work unit receive mechanism 125. The results returned to the work unit receive mechanism 125 include the 10% completion results, the 50% completion results and the final completion results.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, public distributed computing mechanism 123, and work units 127 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiments each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links. Note that the preferred signal bearing media is tangible.

Figure 2:
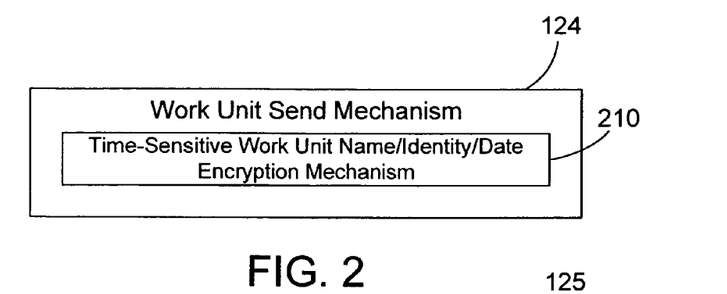
FIG. 2 is block diagram showing details of the work unit send mechanism shown in FIG. 1.

Referring to FIG. 2, the work unit send mechanism 124 includes a time-sensitive work unit name/identity/date encryption mechanism 210. In the preferred embodiments, the encryption mechanism 210 concatenates the server work unit name 128 with the user identity and current date, then encrypts the result with a time-sensitive key. We assume that all work unit names are unique, and that all user identities are likewise unique. Thus, by concatenating the two with the current date, a unique name for this work unit and this particular user is generated. While any time-sensitive key could be used, the key in the most preferred implementation is date-sensitive, thereby allowing results beyond some specified date range to be rejected because the date-sensitive key has been changed. The work unit name sent to a client computer system is the encrypted work unit name.

Figure 3:
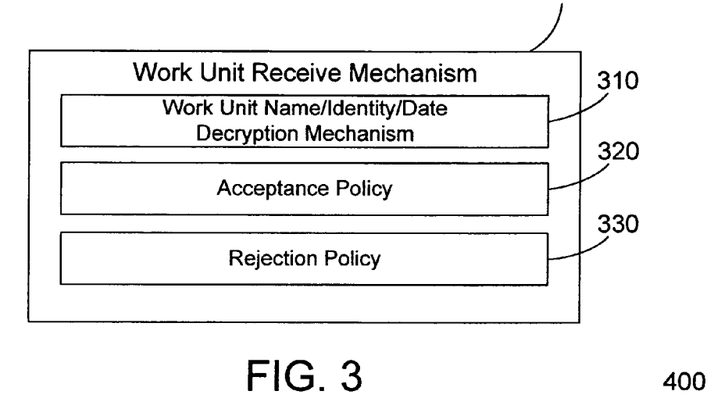
FIG. 3 is block diagram showing details of the work unit receive mechanism shown in FIG. 1.

Referring to FIG. 3, the work unit receive mechanism 125 includes a work unit name/identity/date decryption mechanism 310, an acceptance policy 320, and a rejection policy 330. The work unit name/identity/date decryption mechanism 310 decrypts the client work unit name stored with the completed result returned by the client computer system. If the decrypted work unit name and identity match the server work unit name 128, the identity of the user to whom the work unit was sent, and if the current date is in the lifetime of the time-sensitive key, the work unit receive mechanism 125 accepts the results according to the acceptance policy 320. If the decrypted work unit name does not match the server work unit name 128, or if the identity does not match the identity of the user to whom the work unit was sent, or if the date does not correlate with the time-sensitive key, the work unit receive mechanism 125 rejects the results according to the rejection policy 330. The encryption scheme presented herein does not require validation of the actual identity of a user, only that the identity to whom the work unit was sent is the same as the identity from whom the result was received. This simple encryption scheme foils many attempts to spoof a server that has distributed work units in a public distributed computing environment.

Figure 4:
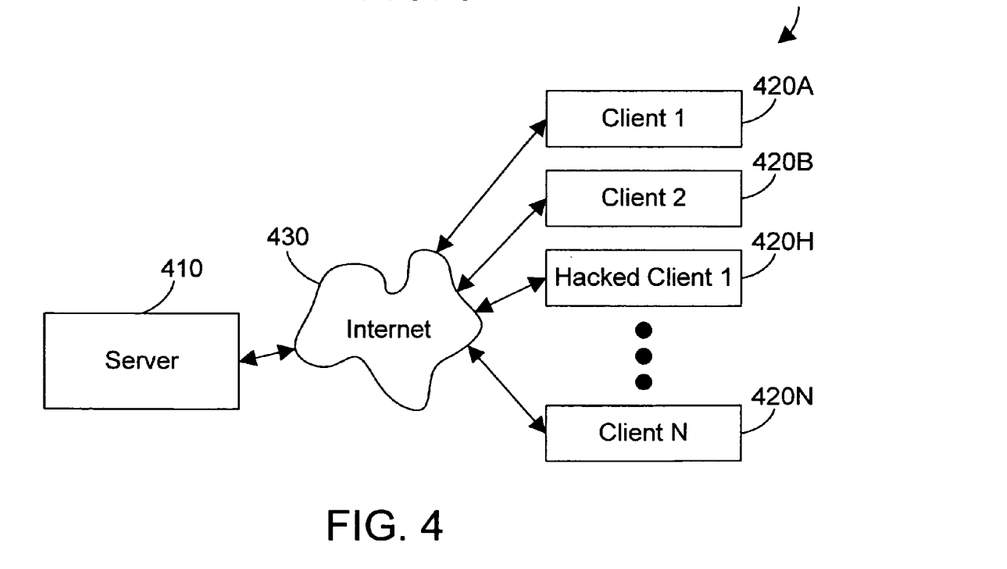
FIG. 4 is a block diagram of a sample server/client computer system that may be used for public distributed computing.

Referring now to FIG. 4, a networked computer system 400 shows a sample network that could be used to process tasks for public distributed computing. A server computer system 410 is coupled to client computer systems 420 via a network connection 430, such as the Internet. The server computer system 410 has work units to distribute to client computer systems 420 that indicate a desire to receive work units. Client computer system 420 are shown in FIG. 4 as 420A, 420B, ..., 420N. One or more hacked clients 420H may also exist and attempt to obtain work units and return supposed results in hopes of acceptance (with or without obtaining a work unit), using any and all means to avoid a proper computation. The server computer system 410 distributes work units to the clients 420, then receives the results from the clients 420. In this manner, a large number of computer systems may cooperate to perform computations for a very large task.

Figure 5:
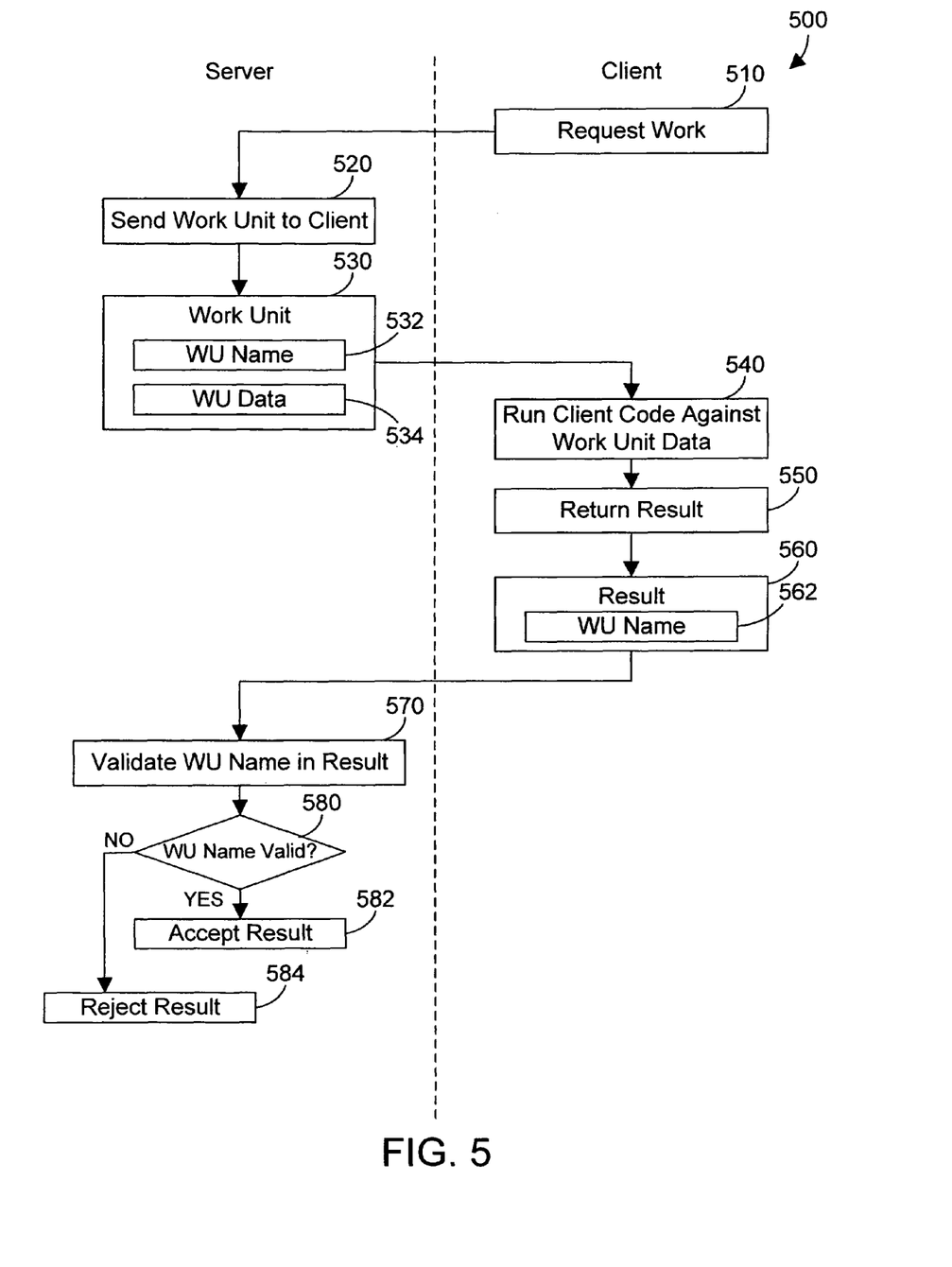
FIG. 5 is a flow diagram of one possible method for performing public distributed computing.

Referring now to FIG. 5, one possible method 500 for public distributed computing is shown. Note that the steps performed by the server are shown on the left half of FIG. 5, while the steps performed by the client are on the right half of FIG. 5. We assume that the client has already requested to the server to participate, the server has authorized the client to participate, and the user has downloaded and deployed the client code 126. At this point the client requests work (step 510). In response, the server sends a work unit to the client (step 520). The work unit is shown at 530 in FIG. 5 to include a work unit name 532 and work unit data 534. The client then executes the client code against the work unit data 534 to perform the desired computation (step 540), and returns the result (step 550). The result is shown at 560 to include the work unit name 562. The server validates the work unit name in the result to assure the work unit name is valid (step 570). If the work unit name is valid (step 580=YES), the result is accepted (step 582). If the work unit name is not valid (step 580=NO), the result is rejected (step 584).

There are other possible implementations, but they fall short of the present invention. One common scheme already mentioned is a "voting scheme" where work is redundantly calculated by several users. In this scenario, "Accept Result" (step 582) is an entry to a "voting" process whereby the ultimate result comes from deciding which answer is in the majority. As long as hacking stays in the single percentage points, this can be quite effective. As the percentage rises, it becomes more problematic. Moreover, it does not account for a concerted effort by cooperative hackers to observe which work units go to whom and share results. This can be calculating the result but once (with the others piggybacking on the other's single answer) or inserting an outright bogus result not just once, but by all cooperating hackers with that work unit. Such a scheme, if it could be implemented, will not just cause voting to fail, it will threaten the computational integrity of the result. If the project further permits uploading work without a download (as some do), this sort of cooperation is easier still. Discouraging bad results (of any kind) can be difficult as even honest users may return bad results, so few projects penalize users heavily, if at all, if the computation is incorrect. The present invention allows any sort of policy for bad results, but will prevent any an upload without a corresponding download, which makes it harder for hackers to preferentially select work, since (at the least) they may no longer arbitrarily replicate, pool, or exchange work units freely. All before anything else, they must each receive the same unit and may only return it once per receipt. In response, they may attempt to download and discard unwanted units, but the network resource is finite, the total work unit count is large, and so there is reason to suspect that they will have difficulty obtaining picked units by a strategy of extravagant downloads and discarding the excess.

An obvious scheme not generally used would be to keep a data base of outstanding work units. This would allow the project to ensure that any upload was at least matched with an earlier download and, moreover, each result is returned but once. However, that scheme, which requires at least one data base access, can be computationally intensive in this environment where the server is such a small fraction of the total system horsepower. On successful projects, the backlog of outstanding work is often surprisingly large, even for legitimate users, as network outages are always a concern. Many projects actually encourage multiple outstanding work units, which multiplies the difficulties of this otherwise obvious scheme. The present invention achieves a similar result by having the work unit have a self-validating component that cannot be corrupted yet does not require a data base access to validate. Moreover, except for the few units in the process of being sent out or received, the storage cost for validating the one-time send-and-receive of each work unit is transferred to the client from the server in the present invention.

Sending out work units with known answers can be effective, but one dilemma is knowing who to send them out to. Legitimate users can run up surprisingly high scores and hackers may, if they choose, not run up a high score in a single account. If they are relatively few in number, it may be hard to find them. Moreover, there remains the risk that a relatively small and static number of known units could be detected by hackers, especially if they cooperate. The present invention improves on this scheme by causing hackers to undergo a risk that any work unit could be at least partially validated.

Security in public distributed computing is typically "security by obscurity", which means the server attempts do to things that, in general, are more of a hope than an actual method. By performing only rudimentary validation as described above, methods for distributed public computing are vulnerable to accepting results that have not been computed, which results in potentially running up the scores for users that have not actually performed the computation in the work unit. The preferred embodiments make it much more difficult to run up a score or otherwise spoof a server into accepting incorrect results for work units.

Figure 6:
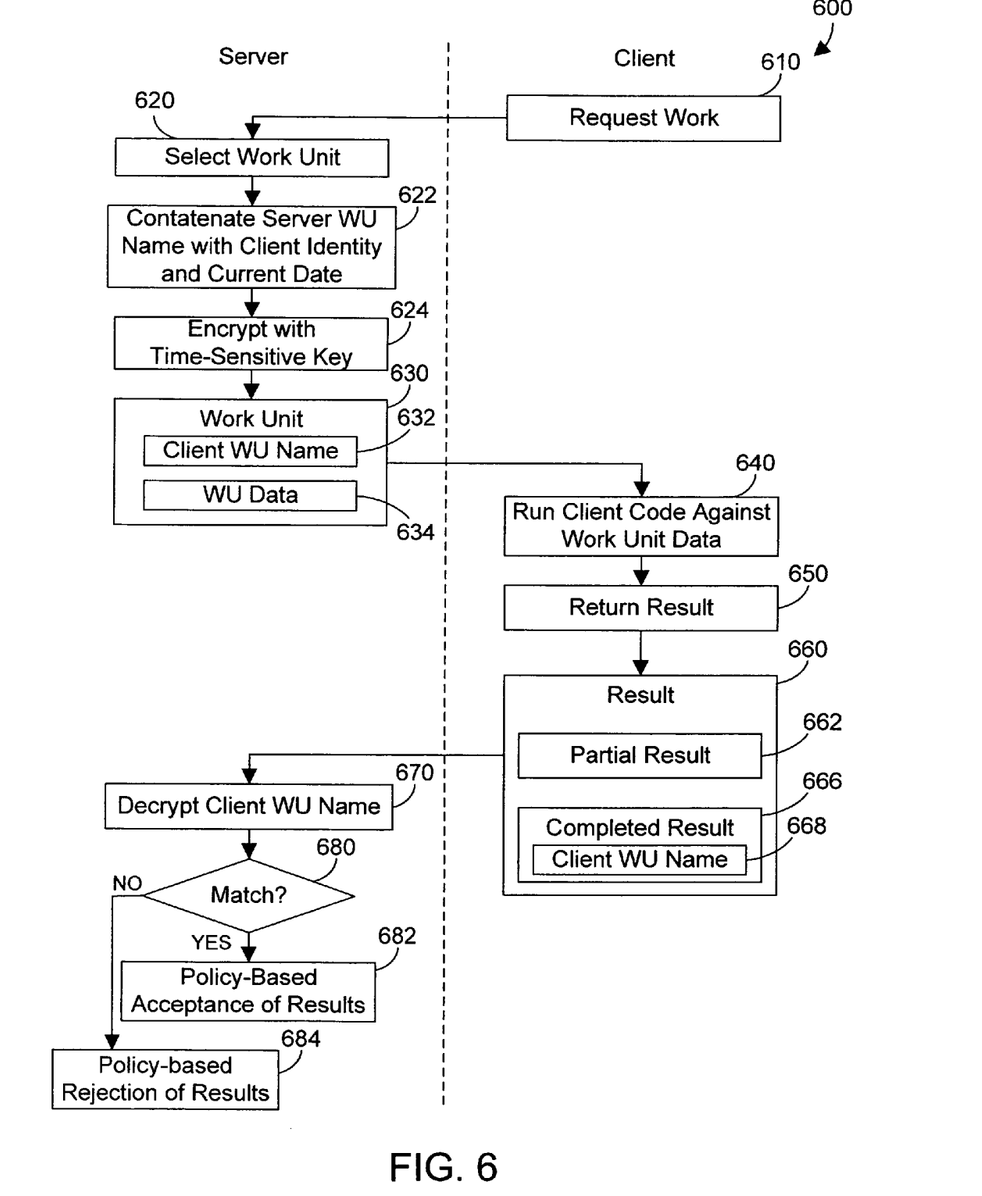
FIG. 6 is a flow diagram of a method in accordance with the preferred embodiments for performing public distributed computing.

Referring to FIG. 6, a method 600 for performing public distributed computing in accordance with the preferred embodiments also assumes that the client has already requested to the server to participate, the server has authorized the client to participate, and the client has already downloaded the client code (126 in FIG. 1). The client then requests work (step 610). In response, the server selects a work unit to send to the user (step 620). The server work unit name (128 in FIG. 1) is concatenated with the client identity and the current date (step 622). The result is encrypted with a time-sensitive key (step 624). The work unit 630 is then sent to the client with the encrypted client work unit name 632 and the work unit data 634. Note that work unit data 634 preferably corresponds to work unit data 129 in FIG. 1. The client then runs the client code against the work unit data (step 640). The results are returned to the server (step 650). The results 660 include one or more partial results 662. If the size of the partial results are modest, they are stored directly. If extensive, they are checksummed using a suitable algorithm such as SHA-1. The returned client work unit name 668 must match the client work unit name 632 that was sent. The server decrypts the client work unit name from the results using the current time-sensitive key. If the decrypted work unit name matches the server work unit name (127 in FIG. 1), if the user identity matches, and if the date is in the lifetime of the current time-sensitive key (step 680=YES), the results are accepted according to a defined acceptance policy (step 682). If the decrypted work unit name does not match the server work unit name or the user identity does not match or the date does not correspond to the lifetime of the time-sensitive key (step 680=NO), the results are rejected according to a defined rejection policy (step 684).

Figure 7:
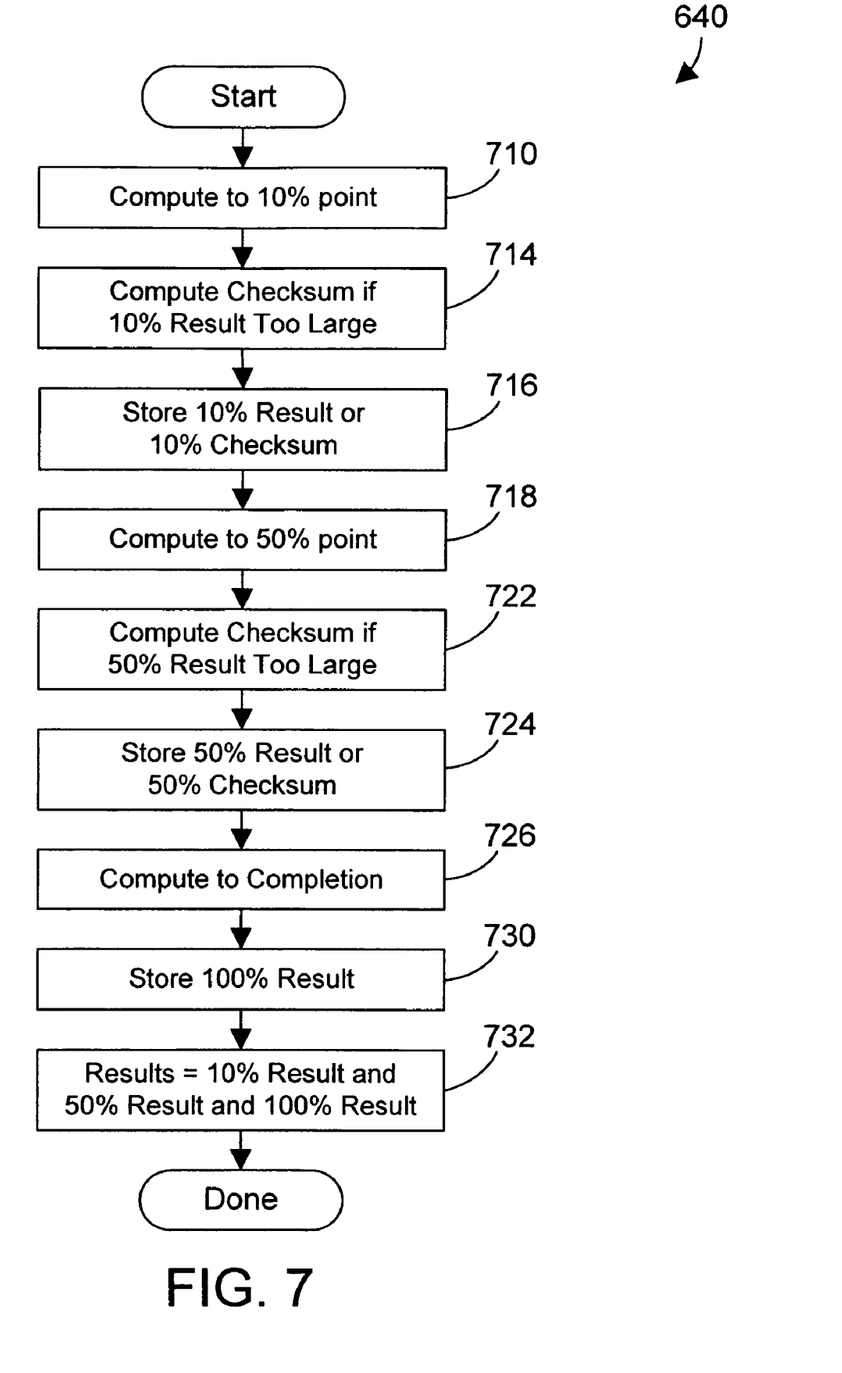
FIG. 7 is a flow diagram showing one specific implementation of step 640 in FIG. 6 in accordance with the preferred embodiments.

Referring to FIG. 7, some sample steps that may result from running the client code in step 640 in FIG. 6 are shown. We assume for this specific example that the client code is defined to compute and store two partial results, one at the 10% point and another at the 50% point. Thus, method 710 begins by computing results to the 10% point (step 710). If the 10% result is too large, a checksum may be computed (step 714), which uses a suitable algorithm, such as SHA-1, and commences with the client work unit name ahead of the partial results. The 10% result is saved or, alternatively, the checksum, if needed (step 716). The computation continues to the 50% point (step 718). A checksum is computed for the 50% results, if needed (step 722). The 50% result is saved or, alternatively, the checksum, if needed (step 724). The work unit is then computed to completion (step 726). The final result is then stored with the client work unit name (step 730). The results returned to the server include the stored 10% result, the stored 50% result, and the stored final (or 100%) result (step 732). By having the client code generate one or more intermediate results, the results may be randomly checked by assigning a trusted computer system to recompute the work unit to the intermediate result, without having to recompute the entire work unit.

Figure 8:
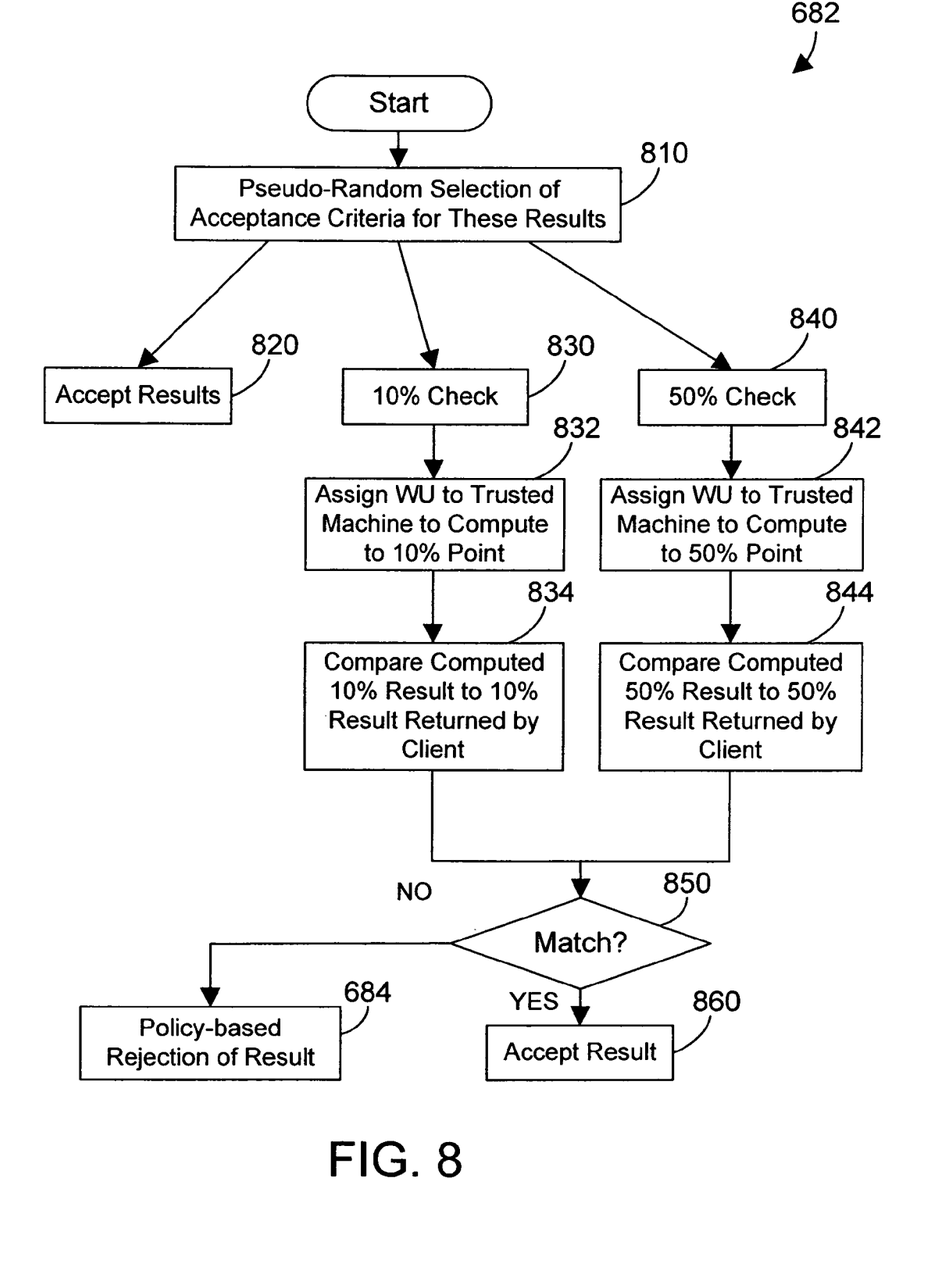
FIG. 8 is a flow diagram showing one specific implementation of step 682 in FIG. 6 in accordance with the preferred embodiments.

Referring back to FIG. 6, one suitable implementation of the policy-based acceptance of the results in step 682 is shown as method 682 in FIG. 8. We assume a pseudo-random selection of the acceptance criteria for a particular result (step 810). This is pseudo-random because it can include any mechanism for mixing up the acceptance criteria. The ideal mechanism would not only be pseudo-random, but cryptographically so. One must consider that hackers may create expendable identities in hopes of following the flow at 682. The objective would be to discover how to submit work in the nonexpendable hacker identities that would always take the "accepted" path (820), either by avoiding certain work units or carefully timing the submission of results or both. Suitable cryptographic pseudo-random number generation is known in the art and could be used to prevent successful monitoring. This further enhances the invention, because the hackers cannot reliably evade submitting work that eventually goes down all the paths in 682's mechanism. We assume for this example three different acceptance criteria. The results may be accepted (step 820), may be subject to a 10% check (step 830) or may be subject to a 50% check (step 840). If subjected to the 10% check (step 830), the same work unit is assigned to a trusted machine to compute to the 10% point (step 832). A trusted machine in this context is any computer system that the server knows will produce accurate results. The 10% result from the trusted machine is compared to the 10% result returned by the client (step 834). If these match (step 850=YES), the result is accepted (step 860). If they do not match (step 850=NO), the results are rejected according to a rejection policy (step 684).

If subjected to the 50% check (step 840), the same work unit is assigned to a trusted machine to compute to the 50% point (step 842). The 50% result from the trusted machine is compared to the 50% result returned by the client (step 844). If these match (step 850=YES), the result is accepted (step 860). If they do not match (step 850=NO), the results are rejected according to a rejection policy (step 684). The method 682 shown in FIG. 8 allows the server administrators to choose, economically, how often to recheck results. As long as every user identity eventually traverses paths beginning with 830 and 840, hackers' previously accepted work units accepted through 820 are always at risk of post facto discovery, even if the percentages for reaching 830 and 840 are fairly low. Notice that because the recomputation is not a full recomputation, especially on path 830, that whatever resources are given to the trusted recomputation path, they are effectively multiplied by 10 or 2, respectively, which helps overcome the horsepower advantage of the collective client horde.

Note that duplicate completed work units could be easily detected by maintaining a database of the work unit answers, and by assuring that each answer inserted into the database is unique. Thus, step 820 in FIG. 8 could be modified to perform such an insertion check that would accept the result if the record being inserted is not currently in the database, and would reject the result if the record being inserted is already in the database.

Figure 9:
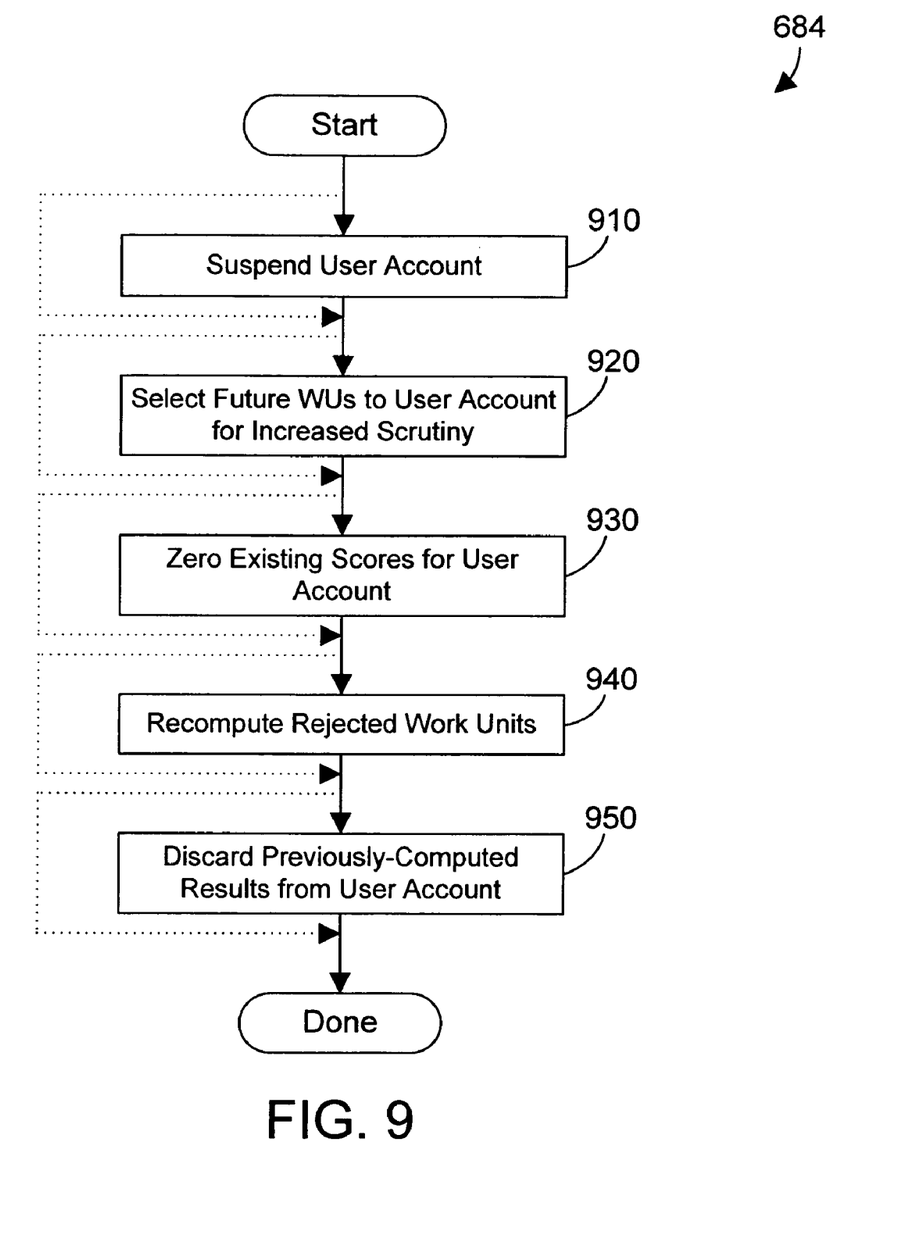
FIG. 9 is a flow diagram showing one specific implementation of step 684 in FIG. 6 in accordance with the preferred embodiments.

Referring back to FIG. 6, one suitable implementation for the policy-based rejection of results 684 is shown as method 684 in FIG. 9. One possible consequence when invalid results are detected is to suspend the user account (step 910). Future work units to the user account may be selected for increased scrutiny (step 920). For example, the server could specify that the next five work units be completely recomputed by a trusted computer system, or may specify that the results be subjected to a 10% or 50% check. The existing scores for the user account could be zeroed out (step 930). The rejected work units could be recomputed (step 940). Previously-computed results from the user account could be discarded (step 950). Note that any suitable combination of the steps in FIG. 9 could be performed, which means that any of the steps could be omitted and any or all of the steps could be performed, as indicated by the dotted lines that allow selecting any suitable path for performing whatever steps are desired. By checking the work unit results and taking appropriate action when results are rejected, the likelihood of accepting incorrect results as valid is substantially reduced. Moreover, the present invention, with suitable policies, will deter many hacking attempts to start with, by frustrating many hackers' known desires.

Attacks

In art of this nature, the advantages of the invention are not always immediately apparent. There is an asymmetry between how the hackers attack the system and how to handle the attack. Some attacks, and the present invention's influence on these attacks, will now be described.

Attack One: Simple Replay of Results—One Machine Calculates a Result Honestly and Distributes it to N Machines, all of Whom Return the Same Result with the Same User Identity.

If this straightforward replay is attempted, the attempt to replicate the result will fail on the ordinary insert operation for the results. In any scheme, results will be stored in some form of data base and preferentially, using typical relational data base schemes. By simply keying the file, at least in part, with the concatenation of the secret server work unit name, user identity, and time stamp, and requiring that key to be unique, the attempt to straightforwardly replay a result will fail on the insert. If non-data base means are used, the same result can be uncovered as the data will still require some sort of keyed organization. With a true data base scheme, the cost of straightforward replay detection, then, is zero over and above the decryption scheme of the base invention. Note that this may require a policy change for some projects. Some do not tie a work unit to a particular user identifier. This invention requires such a restriction which, while not universal, is commonplace and (in the end) unobjectionable.

Attack Two: Forging of Results

While it is impossible to imagine all forgings, several types are made difficult. Simply swapping the identifier of two honest computations and returning the results four times is defeated as before as it is a variant of the replay of results. Forging the header itself is defeated by the encryption. More substantial forgeries should eventually be detected by the computations to the 10 and 50 percent point. This is because forgeries will, by their nature, have the wrong answer. That is to say, some forged results will be accepted for a time (those that go down path 820 in FIG. 8), but eventually (and randomly), recomputation will detect any sort of simple forgery that doesn't do the vast majority of an honest computation. Once recomputation fails, old results can be scrutinized and (if need be) recalculated or removed from the voting process, if that process is present (along with other heretofore undetected results that "vote" the same way). This invention has little to say for forgeries that compute honestly to the fifty percent point and then lie, but for the vast majority of known cheaters, being required to compute to such an extent would be sufficiently de-motivating as to make the effort to cheat unattractive. If this became a problem, a third computation would go, betimes, through the whole unit. Those motivated by attempting to derail the computation (without the motivation of building a user identity and a high score for it) will be the hardest to defeat with these means, as they simply will do few computations per user identity, and suffer the loss of some of them. As far as is known, such forms of vandalism are currently rare. In response to other hacking scenarios, "joining up" to other on-line entities requires receiving a confirming e-mail, clicking on a special web link, and, among other things, manually entering a string of text that are presented as a badly distorted picture of that text, which would be hard to decipher by machine. This probably is sufficient to limit the number of identities all before other means of protecting the computation are considered, because it means creating new user identities is a manual and relatively slow process, and requires a "live" e-mail address to boot, risking detection of the creation of excessive identifiers. But, a limited number of user entities for hackers plays to the strengths of the present invention. And, in any case, the current forms of vandalism/cheating will be managed very well.

Attack Three: Forging of User Identifiers

The concept here is similar to Attack One discussed above. One machine computes a work unit honestly and distributes it to N other machines. The idea would be to alter the result as required (e.g., change the user identity) and each return the updated answer under their own user identifier.

The present invention defeats this because the client work unit name is unique for each distributed work unit. That is to say, every time a work unit is downloaded, it contains an encrypted and unique identifier for that work unit, including a timestamp. Because it is encrypted, it is computationally infeasible for a hacked client (with good encryption at the server) to decrypt the header and alter it. Alteration of the encrypted header is valueless, because when decrypted, it will, with prohibitive probability, fail to match at least one of the user identity, a valid server work unit name, and the valid time stamp consistent with the current time-sensitive key.

Attack Four: Evading the 10 and 50 Percent Checks

The idea here is to somehow monitor the outgoing flow or the incoming flow and, in some manner, find a weakness such that by either selecting work units carefully or submitting with cunning timing, the paths at 830 and 840 in 682 are never taken.

In general, the encryption of work unit headers is not an assist here. A given work unit (provided redundancy is contemplated) will have an identifiable sequential data stream of actual data that will be, in practice, unique all independent of the client work unit name or the server work unit name. Thus, cooperating hackers can be expected to know if any pair of them obtained the same underlying work unit. By establishing "expendable" user identities (ones which the hacker is indifferent, at best, as to whether they are caught out), hacked results (either the same or different) could be sent in using one or more of these expendable user identities and see when and how the cheating is detected.

The present invention preferably uses a pseudo-random choice between the paths in method 682 in FIG. 8 using some sort of encryption scheme. Such a scheme is not very costly, because in general, it will need only a handful of bits. For instance, one way of doing cryptographic random numbers with DES is to have a separate time-sensitive secret key and successively encrypt ascending integers 1, 2, 3 . . . N using Cipher Feedback Mode. The resulting bit stream can be carved up any way necessary and the result is both pseudo-random and unpredictable. Many regular pseudo-random number generators have successively predictable results, by contrast. Unlike DES, knowing one or two predicts the rest. But, since DES produces 64 bits at a time, if only (say) six are needed to make the choice for 682, then at least 10 different pseudo-random selections can be made per DES encrypt. Thus, the individual pseudo-random generation cost for the selection is normalized to only $\frac{1}{10}$ of DES in this particular scenario, which is incrementally affordable over the encrypt and decrypt of the server work unit name, user identifier, and timestamp already contemplated.

Attack Five: Obtaining Preferred Work Units

As long as they are honestly calculated, there is probably no particular need to defend against clients going for work units with suspected below average computation costs. However, some attention could be paid to the outgoing work unit flow to prevent distortion and to help prevent unknown cheats based on work unit content. Pseudo-random and encryption-based selection for client download of the work unit could take place and work units intermixed from a variety of sources to avoid cases where the underlying input is a sample of natural phenomena and contains "streaks" of easy units.

The hackers could still download at will, discarding units, until they get what they like, but bandwidth is a precious resource and this is an uncertain scheme. Indeed, if it is pursued too vigorously, it will begin to resemble a denial of service attack and so be conventionally detected and dealt with.

This is by no means an exhaustive set of attacks. Some additional attacks will fail thanks to the present invention, but others may not—no security scheme is flawless. Yet, despite not defeating every imaginable attack, it appears likely that the vast majority of current public distributed computing vandalism—that motivated by the desire for a high score—will be defeated by the present invention as the hackers desiring any nontrivial score will eventually run afoul of the forge-proof headers or the partial computation checks.

The preferred embodiments provide a relatively simple way to authenticate computed results in a public distributed computing environment. Encryption of an identifier comprising the work unit name, an identity for the user, and the current date assures the work unit returned from the user corresponds to the work unit recently assigned to the user identity. In addition, by computing one or more partial results, and by randomly checking work units by having them recomputed to one or both partial results by a trusted computer system, the chances are good of catching users that try to repeatedly increase their scores by submitting work units that have not been executed to completion.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
   at least one processor;
   a memory coupled to the at least one processor;
   a public distributed computing mechanism residing in the memory and executed by the at least one processor, the public distributed computing mechanism comprising:
      a work unit send mechanism that sends a selected work unit to a client computer system, the selected work unit comprising work unit data that is operated on by client code on the client computer system, wherein the client code computes a first partial result, a second partial result and a completed result for the selected work unit; and
      a work unit receive mechanism that receives the first partial result, the second partial result and the completed result from the client computer system and performs cryptographic pseudo-random selection of acceptance criteria for the completed result, the acceptance criteria comprising:
         (A) accepting the completed result as valid;
         (B) assigning the selected work unit to a trusted client computer system to compute to the first partial result, and comparing the first partial result from the client computer system to the first partial result from the trusted client computer system, and when the first partial result from the client computer system and the first partial result from the trusted client computer system match, accepting as valid the completed result from the client computer system, and when the first partial result from the client computer system and the first partial result from the trusted client computer system do not match, performing a first selection of rejection criteria for the completed result; and
         (C) assigning the selected work unit to the trusted client computer system to compute to the second partial result, and comparing the second partial result from the client computer system to the second partial result from the trusted client computer system, and when the second partial result from the client computer system and the second partial result from the trusted client computer system match, accepting as valid the completed result from the client computer system, and when the second partial result from the client computer system and the second partial result from the trusted client computer system do not match, performing a second pseudo-random selection of the rejection criteria for the completed result.

2. The apparatus of claim 1 wherein the work unit send mechanism encrypts a work unit name for the selected work unit and an identity corresponding to a user using a time-sensitive key to generate an encrypted client work unit name, the work unit send mechanism sending the selected work unit with the encrypted client work unit name to the client computer system, and wherein the work unit receive mechanism decrypts a client work unit name in the first partial result and in the completed result and determines whether the decrypted client work unit name matches the work unit name for the selected work unit, and if so, the work unit receive mechanism performs the cryptographic pseudo-random selection of the acceptance criteria according to a predetermined acceptance policy.

3. The apparatus of claim 2 wherein, if the decrypted client work unit name does not match the work unit name for the selected work unit, the work unit receive mechanism rejects the completed result according to the rejection criteria.

4. The apparatus of claim 3 wherein the rejection criteria comprises:
   suspending an account corresponding to the identity;
   selecting at least one future work unit to the identity for increased scrutiny;
   zeroing at least one existing score corresponding to the identity;
   recomputing at least one rejected work unit corresponding to the identity; and
   discarding at least one previously-computed result corresponding to the identity.

5. A computer-implemented method for a server computer system to perform public distributed computing, the method comprising the steps of:
   sending a selected work unit to a client computer system, the selected work unit comprising work unit data that is operated on by client code on the client computer system, wherein the client code computes a first partial result, a second partial result and a completed result for the selected work unit;
   receiving the first partial result, the second partial result and the completed result from the client computer system; and
   performing cryptographic pseudo-random selection of acceptance criteria for the completed result, the acceptance criteria comprising:
      (A) accepting the completed result as valid;
      (B) assigning the selected work unit to a trusted client computer system to compute to the first partial result, and comparing the first partial result from the client computer system to the first partial result from the trusted client computer system, and when the first partial result from the client computer system and the first partial result from the trusted client computer system match, accepting as valid the completed result from the client computer system, and when the first partial result from the client computer system and the first partial result from the trusted client computer system do not match, performing a first selection of rejection criteria for the completed result; and
      (C) assigning the selected work unit to the trusted client computer system to compute to the second partial result, and comparing the second partial result from the client computer system to the second partial result from the trusted client computer system, and when the second partial result from the client computer system and the second partial result from the trusted client computer system match, accepting as valid the completed result from the client computer system, and when the second partial result from the client computer system and the second partial result from the trusted client computer system do not match, performing a second selection of the rejection criteria for the completed result.

6. The method of claim 5 further comprising the steps of:
encrypting a work unit name for the selected work unit and an identity corresponding to a user using a time-sensitive key to generate an encrypted client work unit name;
sending the selected work unit with the encrypted client work unit name to the client computer system;
decrypting a client work unit name in the first partial result and in the completed result;
determining whether the decrypted client work unit name matches the work unit name for the selected work unit; and
if the decrypted client work unit name matches the work unit name for the selected work unit, performing the cryptographic pseudo-random selection of the acceptance criteria according to a predetermined acceptance policy.

7. The method of claim 6 wherein, if the decrypted client work unit name does not match the work unit name for the selected work unit, rejecting the completed result according to the rejection criteria.

8. The method of claim 7 wherein the rejection criteria comprises:
suspending an account corresponding to the identity;
selecting at least one future work unit to the identity for increased scrutiny;
zeroing at least one existing score corresponding to the identity;
recomputing at least one rejected work unit corresponding to the identity; and
discarding at least one previously-computed result corresponding to the identity.

9. A computer-readable program product residing on recordable media comprising:
a public distributed computing mechanism comprising:
a work unit send mechanism that sends a selected work unit to a client computer system, the selected work unit comprising work unit data that is operated on by client code on the client computer system, wherein the client code computes a first partial result, a second partial result and a completed result for the selected work; and
a work unit receive mechanism that receives the first partial result, the second partial result and the completed result from the client computer system and performs cryptographic pseudo-random selection of acceptance criteria for the completed result, the acceptance criteria comprising:
(A) accepting the completed result as valid;
(B) assigning the selected work unit to a trusted client computer system to compute to the first partial result, and comparing the first partial result from the client computer system to the first partial result from the trusted client computer system, and when the first partial result from the client computer system and the first partial result from the trusted client computer system match, accepting as valid the completed result from the client computer system, and when the first partial result from the client computer system and the first partial result from the trusted client computer system do not match, performing a first selection of rejection criteria for the completed result; and
(C) assigning the selected work unit to the trusted client computer system to compute to the second partial result, and comparing the second partial result from the client computer system to the second partial result from the trusted client computer system, and when the second partial result from the client computer system and the second partial result from the trusted client computer system match, accepting as valid the completed result from the client computer system, and when the second partial result from the client computer system and the second partial result from the trusted client computer system do not match, performing a second pseudo-random selection of the rejection criteria for the completed result.

10. The program product of claim 9 wherein the work unit send mechanism encrypts a work unit name for the selected work unit and an identity corresponding to a user using a time-sensitive key to generate an encrypted client work unit name, the work unit send mechanism sending the selected work unit with the encrypted client work unit name to the client computer system, and wherein the work unit receive mechanism decrypts a client work unit name in the first partial result and in the completed result and determines whether the decrypted client work unit name matches the work unit name for the selected work unit, and if so, the work unit receive mechanism performs the cryptographic pseudo-random selection of the acceptance criteria according to a predetermined acceptance policy.

11. The program product of claim 10 wherein, if the decrypted client work unit name does not match the work unit name for the selected work unit, the work unit receive mechanism rejects the completed result according to the rejection criteria.

12. The program product of claim 11 wherein the at least one action to reject the completed result comprises at least one of the steps of:
suspending an account corresponding to the identity;
selecting at least one future work unit to the identity for increased scrutiny;
zeroing at least one existing score corresponding to the identity;
recomputing at least one rejected work unit corresponding to the identity; and
discarding at least one previously-computed result corresponding to the identity.

13. An apparatus comprising:
at least one processor;
a memory coupled to the at least one processor;
a public distributed computing mechanism residing in the memory and executed by the at least one processor, the public distributed computing mechanism comprising:
a work unit send mechanism that sends a selected work unit to a client computer system, the selected work unit comprising work unit data that is operated on by client code on the client computer system, wherein the client code computes a first partial result, a second partial result, and a completed result for the selected work unit, wherein the work unit send mechanism encrypts a work unit name for the selected work unit and an identity corresponding to a user using a time-sensitive key to generate an encrypted client work unit name, the work unit send mechanism sending the selected work unit with the encrypted client work unit name to the client computer system; and a work unit receive mechanism that receives the first partial result, the second partial result, and the completed result from the client computer system, wherein the work unit receive mechanism decrypts a client work unit name in the completed result and determines whether the decrypted client work unit name matches the work unit name for the selected work unit, and if so, the work unit receive mechanism performs cryptographic pseudo-random selection of acceptance criteria for the completed result, the acceptance criteria comprising:

(A) accepting the completed result as valid;

(B) assigning the selected work unit to a trusted client computer system to compute to the first partial result, and comparing the first partial result from the client computer system to the first partial result from the trusted client computer system, and when the first partial result from the client computer system and the first partial result from the trusted client computer system match, accepting as valid the completed result from the client computer system, and when the first partial result from the client computer system and the first partial result from the trusted client computer system do not match, performing a first selection of rejection criteria for the completed result, the rejection criteria comprising:

suspending an account corresponding to the identity;

selecting at least one future work unit to the identity for increased scrutiny;

zeroing at least one existing score corresponding to the identity;

recomputing at least one rejected work unit corresponding to the identity; and discarding at least one previously-computed result corresponding to the identity; and (C) assigning the selected work unit to a trusted client computer system to compute to the second partial result, and comparing the second partial result from the client computer system to the second partial result from the trusted client computer system, and when the second partial result from the client computer system and the second partial result from the trusted client computer system match, accepting as valid the completed result from the client computer system, and when the second partial result from the client computer system and the second partial result from the trusted client computer system do not match, performing a second selection of the rejection criteria for the completed result that is different than the first selection of the rejection criteria.

* * * * *